E. L. MUELLER.

Improvement in Egg-Carriers.

No. 125,977.  Patented April 23, 1872.

WITNESSES:  INVENTOR:

Robert Burns  Edward L. Mueller
John W. Herthel  per Herthel & Co.
  Atty's.

125,977

UNITED STATES PATENT OFFICE.

EDWARD L. MUELLER, OF ST. LOUIS, MISSOURI.

IMPROVEMENT IN EGG-CARRIERS.

Specification forming part of Letters Patent No. 125,977, dated April 23, 1872.

*To all whom it may concern:*

Be it known that I, EDWARD L. MUELLER, of St. Louis, in the county of St. Louis, Missouri, have made a certain new and useful Improvement in Egg-Carriers; and I do hereby declare that the following is a full and true description thereof, reference being had to the accompanying drawing and to the letters of reference marked thereon.

The object of this invention is to form an improved egg crate or carrier, simple, cheap, and durable in construction, and in use affording a more safe transportation for eggs, &c., than hitherto achieved. The nature thereof relates to a new arrangement and combination of partitions with circular openings and wooden supporting-slats, in manner now to be more fully described.

To enable those herein skilled to make and use my said invention, I will now more fully describe the same, referring to—

Figure 1:
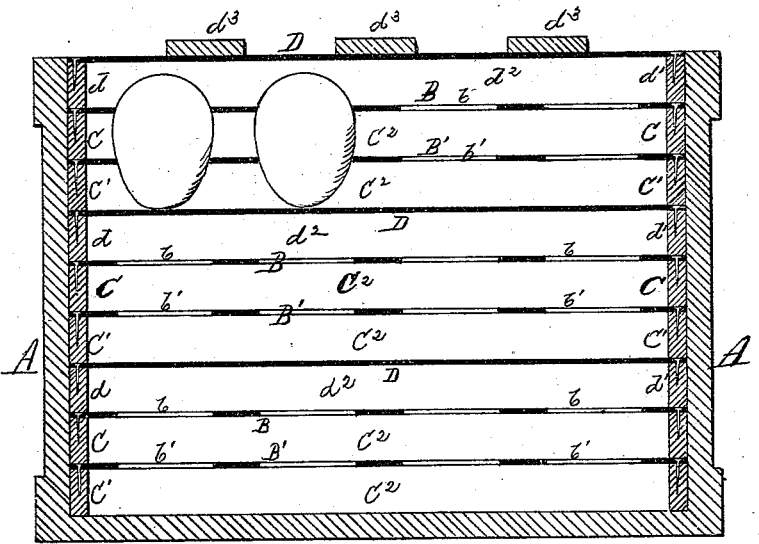
Figure 2:
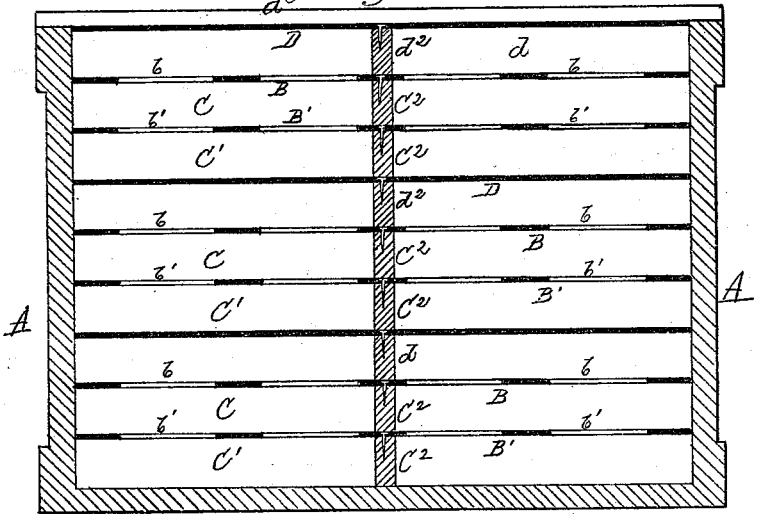

Figure 1 as a longitudinal sectional elevation; Fig. 2, a transverse sectional elevation.

A represents a suitable box, with or without cover. Within said box are placed partitions B B′, which have circular openings $b\ b'$ arranged in parallel lines, the said circular openings being cut of such a diameter as to support the eggs in vertical position, as shown in Fig. 1. The partitions B B′ are retained apart and supported by properly-attached side slats C C¹ and one or more central slats, C², as indicated in the figures.

The eggs are inserted and suspended between the partitions B B′, (see Fig. 1,) the lower partition supporting the eggs, while the upper partition, fitting over, retains the eggs in proper position.

Further, to prevent the breaking of the eggs, and to afford the ends of the eggs a better protection, there are arranged uncut partitions D between each layer of eggs, as shown in Figs. 1 and 2. The said partitions D are provided with similar end and central supporting-slats $d\ d^1\ d^2$.

By means of the circular openings $b\ b'$, as shown, nests are formed more conveniently adapted to accommodate the egg, which can thus be more readily positioned and firmly kept in its nest.

Every layer of eggs being covered by an interposing partition, D, a cover for the box may be dispensed with, mere cross-slats $d^3$, secured on top, (see Fig. 1,) being sufficient.

The partitions are made of pasteboard or similar flexible material.

Having thus fully described my said invention, what I claim is—

The partitions B B′, having circular openings $b\ b'$, slats C C¹ C², uncut partitions D with slats $d\ d^1\ d^2$, all arranged in combination with box A, substantially as and for the purpose set forth.

In testimony of said invention I have hereunto set my hand.

EDWARD L. MUELLER.

Witnesses:
WILLIAM W. HERTHEL,
ROBERT BURNS.